Sept. 20, 1966  U. L. WERTANEN  3,273,254
ELECTROMAGNETIC MEANS OF GUIDANCE
Filed Dec. 9, 1963
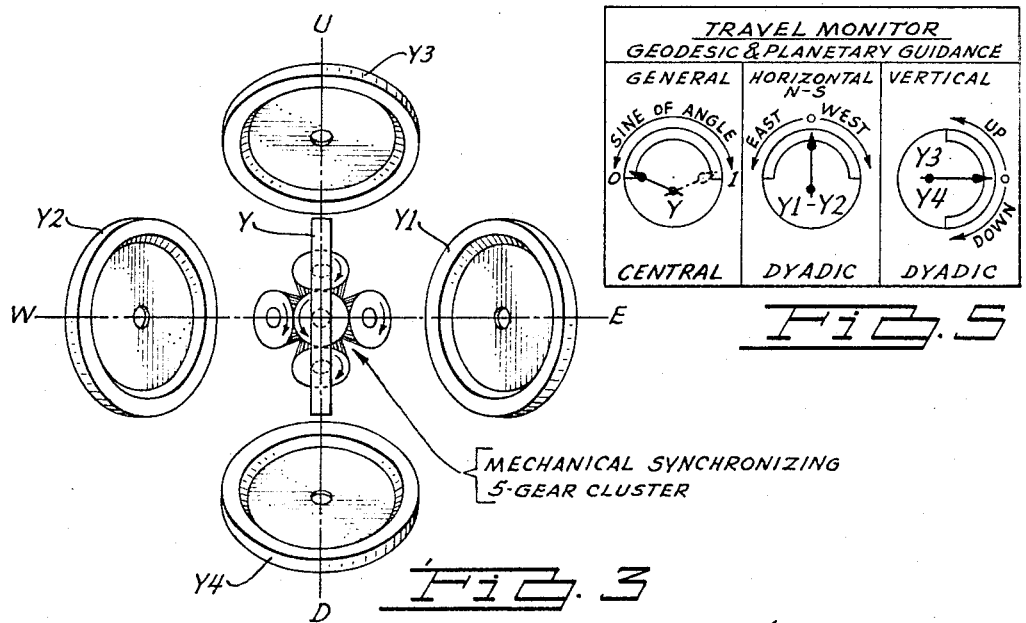
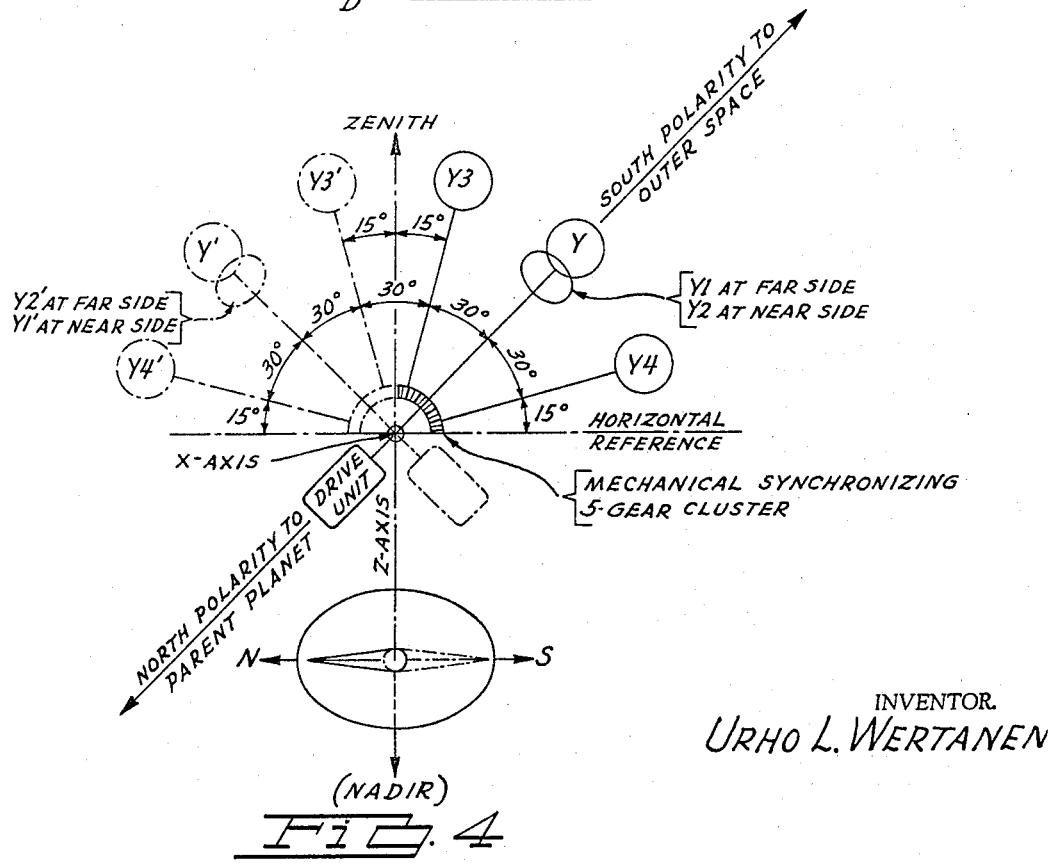
INVENTOR.
URHO L. WERTANEN

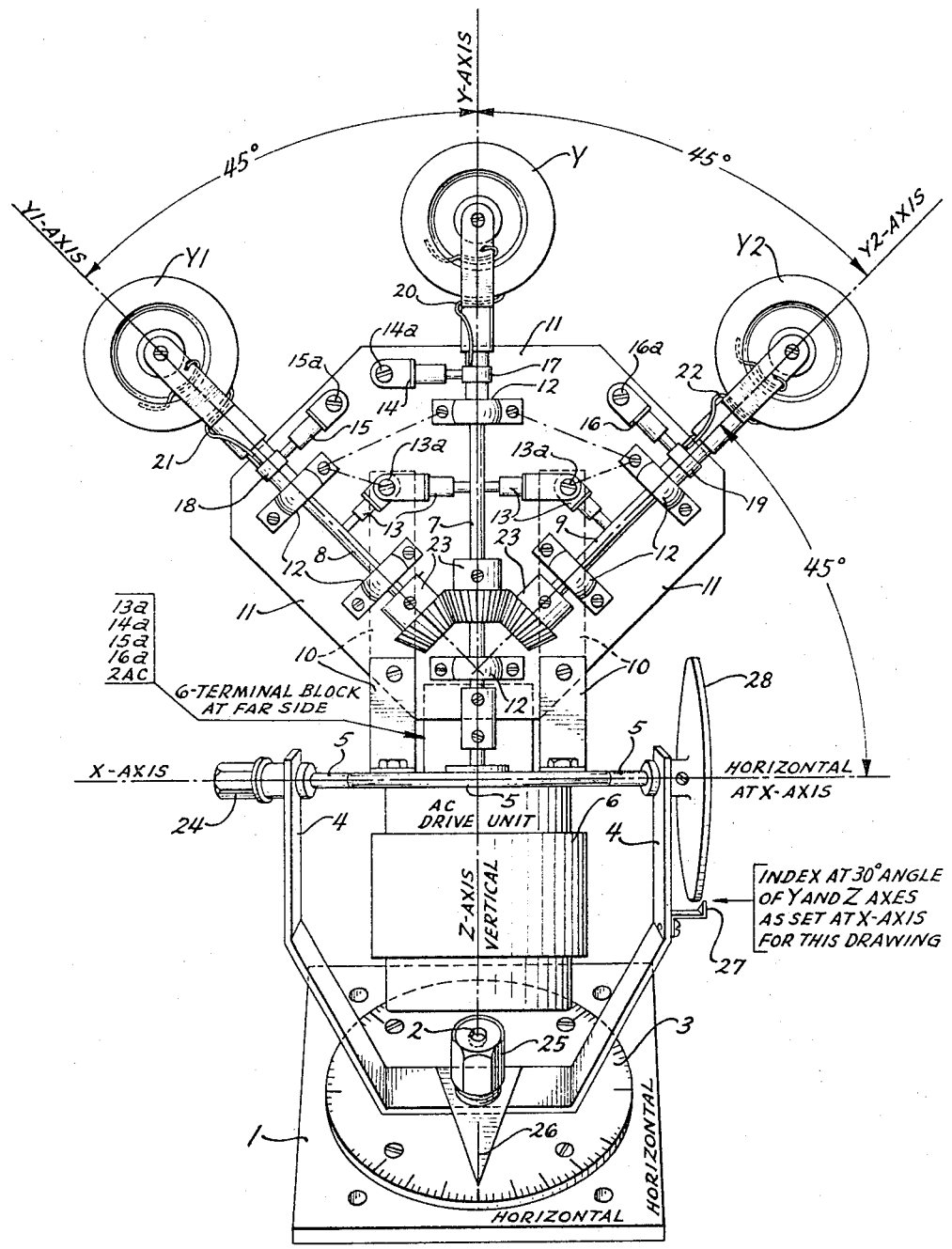

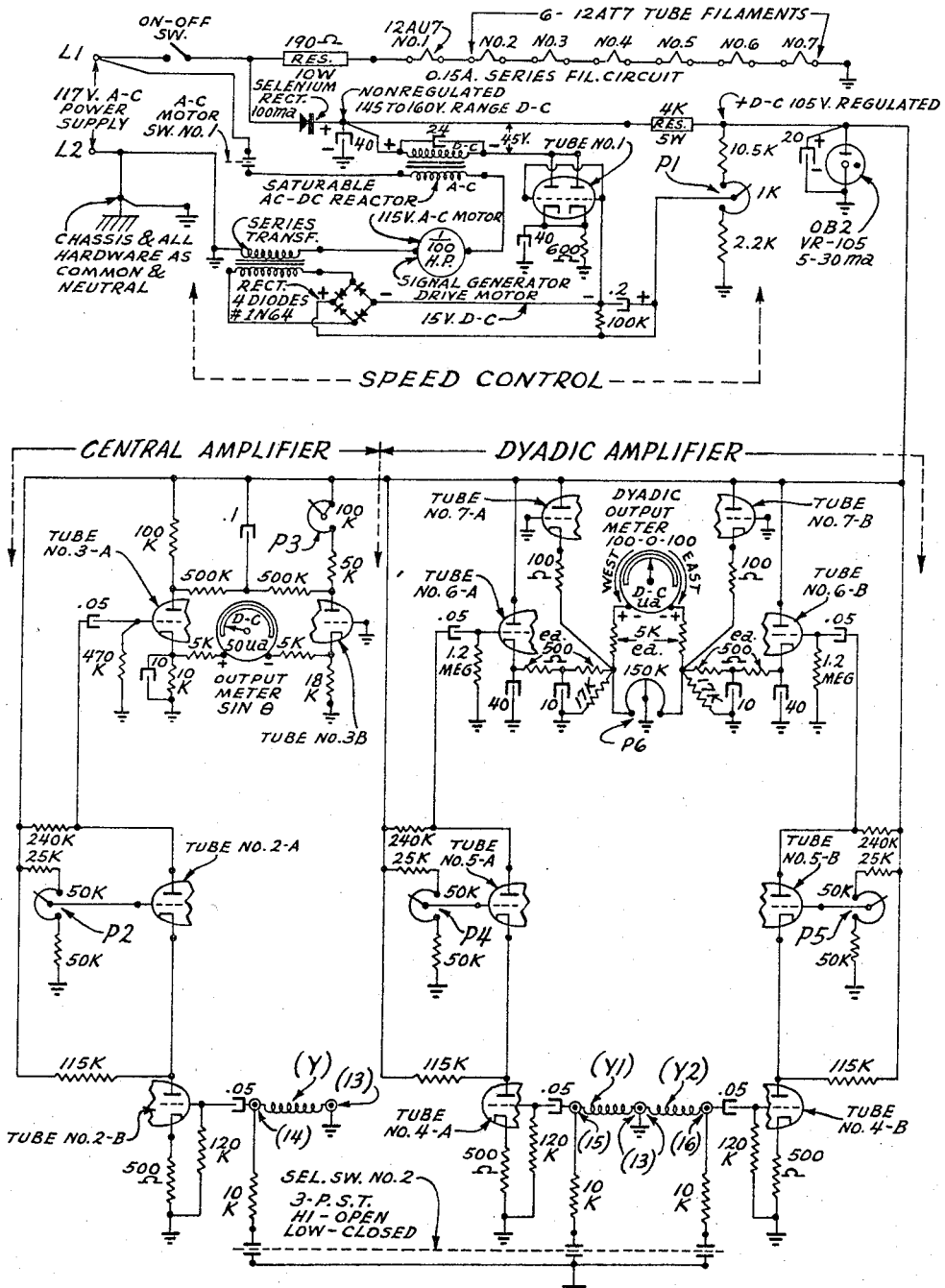

United States Patent Office 3,273,254
Patented Sept. 20, 1966

3,273,254
ELECTROMAGNETIC MEANS OF GUIDANCE
Urho Leander Wertanen, 7281 Freda, Dearborn, Mich.
Filed Dec. 9, 1963, Ser. No. 331,078
4 Claims. (Cl. 33—222)

This application is a continuation-in-part of my copending application Serial No. 152,100 filed November 13, 1961, for "Electromagnetic Methods of Guidance," now abandoned.

This invention relates to electromagnetic means of guidance as for air, sea, and land based situations of operation and application, and more particularly to the present means of guidance in character and principles of operation.

These ways and means are especially adapted and coordinated as for indicating and continuous monitoring of guidance of a vehicle in travel, by sensing and surveillance of the ambient magnetic field as the reference and excitation for a group of similar rotary coil type sine wave signal generators.

In specific land based situations of operation, as for automatic guidance of vehicles, the magnetic field vector (herein sometimes termed the magnetic excitation) as the reference may be provided in definite external magnetic patterns along with the structural designs of contemplated super modern expressways.

This invention will provide a uniquely simplified electromagnetic character of guidance, as for adaptation and co-ordination with respect to the normal yaw and horizontal axes of a vehicle, and as for the more difficult situations of guidance wherein visibility may be obscured, or may cover an extremely vast expanse of universal visibility but still not including the area of a destination. As for instance, at an opposite side of our earth, or, a similar planet (somewhere within the universe and as would normally be related per se to our sun) and its magnetic field, magnetic latitudes and planes of magnetic meridians.

The invention is generally insensitive to optical and gravitational effects, and in that sense is not intended to seek out, identify, or to recognize any reference beyond the realm of its electromagnetic character. And, as the burden or privilege to utilize other means of reference when available is not restricted in any manner, such other means or elements are not a feature of character or function of this invention.

Among the advantages and objects of this invention is to provide a simplified electromagnetic means of guidance; and to eliminate the need of any floating or gyro oriented accumulation of auxiliary apparatus and their associated complexity; and, more particularly, to provide a guidance system adapted to be contained with a vehicle and applicable under widely diversified conditions and situations of operation.

Other incidental advantages and objects will be pointed out in the present descriptive material along with the pertinent drawings; wherein FIG. 1 is a perspective view of one form of sensing assembly of the invention; FIG. 2 is a schematic wiring diagram; FIG. 3 represents another layout of signal generators carried out in more detail in the diagrammatic drawing of FIG. 4; and, FIG. 5 is a panel view of indicating instruments being referred to later.

In specific character and principles of operation, this method of guidance requires a group of similar rotary coil inductor type sine wave signal generators as illustrated in the example of FIG. 1 at Y, Y1, and Y2, which directly and simultaneously sense components in different angular directions of the ambient magnetic field.

The directly related factors for each generator in operation under no load conditions may be specified and defined in the expression: $E_{max}=6.28$ (sin $\theta$) $FNAB\times10^{-8}$, where $E_{max}$ is equal to the peak value of output voltage; $\theta$ is the angle between the axis of rotation of the coil and the total field vector; F is equal to the rate of rotation of the coil in revolutions/second; N is equal to the total number of series turns of generator winding; A is equal to the mean turn area of the generator winding in square inches; and, B is equal to the magnetic field density of excitation in lines/square inch.

In structure of a sensing assembly as shown in FIG. 1, the mounting base 1 is provided with the attached pivot member 2 and the calibrated dial 3 at the support for the swivelled U-yoke 4. The pivot axis defines a normally vertical Z-AXIS. The yoke 4 has a journal at each side member for the end shafts of the cross-yoke part 5. The axis of the journals defines a normally horizontal X-AXIS. The part 5 in turn carries the drive unit 6 and the group of generators Y, Y1 and Y2 at the end of diverging coplanar rotational shafts 7, 8 and 9, respectively. This assembly has the brackets 10 attached to the part 5 in support of the insulating part 11 used for mounting the bearings 12 and otherwise for attaching the brush rigging parts 13, 14, 15, and 16 by means of the screws 13a, 14a, 15a, and 16a, which also serve as electrical output signal terminals at the far side of the part 11. The insulated electrical collector rings 17, 18, and 19, are each separately connected by soldering to their respective signal generator windings by the leads 20, 21, and 22, brought out at one end of the windings. The other end of each signal generator winding is connected by soldering directly to the hardware at the end of its drive shaft, and by electrical connections between the brush rigging parts 13 these other ends are all made electrically common to all other hardware of the supporting assembly. Each generator drive shaft is provided with a bevel gear 23 and the bevel gears are all in mesh to mechanically synchronize operation of the signal generators Y, Y1 and Y2, and the gears are secured by set screws whereby the winding planes of the several generators may be relatively phased as desired.

The adjustable locking means 24 at the X-AXIS, and 25 at the Z-AXIS, may be loosened to position the group of generators, as in a full circle about the Z-AXIS and in a range of more than 300 degrees about the X-AXIS. The position or attitude as selected or manipulated may then be locked normally to maintain the setting, which may be read directly from the dial 3 as indicated by the index 26 for the Z-AXIS and the index 27 having reference to the calibrated dial 28 at the X-AXIS.

In typical operation of the group of generators shown in FIG. 1, when the Y-AXIS coincides precisely with the local magnetic axis of excitation (field direction) the output signal from the central generator Y will be zero. And simultaneously, the Y1 and Y2 axis generators will be sensing two different coplanar components of the field. The dyadic generators Y1 and Y2 will then be in operation with exactly equal 45 degree angles of effective excitation, and for that angle of excitation each dyadic generator will develop an output signal equal to 70.71% of the maximum that could occur if and when a 90 degree angle of excitation would be effective.

The output signals from the group of generators are fed to separate amplifier sections as shown in the schematic drawing of FIG. 2, which as detailed is predominantly self-explanatory to those skilled in the pertinent art, but it will still be referred to in outlining the control and calibrating features and devices of the circuitry.

The electrical power supply and a voltage regulator are provided together with the SPEED CONTROL section and having the saturable reactor, series transformer, bias control P1 and the motor switch No. 1 to control and maintain substantially constant current and speed at the A.-C. drive motor. When energized, this section of the circuitry functions inversely to either buck or boost, as the case may be, whenever the A.-C. power supply or motor speed may tend to fluctuate above or below a steady state in operation.

The CENTRAL AMPLIFIER section functions very much as in Class A amplification responsive to the output signals from the central generator Y, with the bias control P2 being provided for selection of the range of amplification from zero to maximum, and, the control P3 is provided to zero the 50 microampere D.-C. output indicating instrument when the Y input signal is zero. That indicating instrument may have its dial calibrated in divisions of degrees, voltage, current, or the sine values of angles as optional, but in that respect, it is recommended for practical reasons of conversion to percentile terms that the dial be calibrated from 0 to 1 with minor and major divisions as a scale having 100 graduations accurately co-ordinated for pointer indications at the dial; and, if desired for any reason, the signal potentials at the terminals of the instrument may be supplied to other circuitry for associated purposes.

The DYADIC AMPLIFIER sections also operate similar to Class A amplification responsive to the output signals from the dyadic signal generators Y1 and Y2, having two parallel branches of highly uniform matching of components in symmetrical duplication of the circuitry for balanced dyadic operation and instantaneous response to any differential of their input signals. The bias controls P4 and P5 are provided for selection, adjustment, and co-ordination in operation of the dyadic circuitry in range of amplification from zero to maximum; and, in respect to control, the selector switch No. 2 in 3-pole single throw arrangement is provided as for HI and LOW positions which control the resistor loading across the output from the signal generators Y, Y1 and Y2.

The positions of that selector switch No. 2 may be considered as representing the very high (HI) as space flight, or the ordinary atmospheric, sea, and sub (LOW) level altitudes and situations of operation. At ordinary altitudes the LOW position may be used to apply the loading resistors across the output from the signal generators and all calibrating adjustments and co-ordination should be performed, which it is recommended should be carried out at a location substantially free from any undesirable magnetic disturbance of excitation while the adjustments are being made.

At the higher altitudes of operation the HI position of the selector switch No. 2 should be used to remove the effect of the loading resistors across the output from the signal generators, while at the same time the value of magnetic field density of excitation may be at a low value as compared with the field density of excitation in the general atmospheric areas of our earth. It should be observed especially that in effect this selector feature may be modified for infinitely variable control of the resistor loading of the generators without in any way altering the character or principles of operation of the method of guidance.

The output signals from the several amplifier sections are generally invariable in sign, except that if the dyadic pair of mated generators are inverted (reversed or transposed as in an exchange of position) with respect to each other, the dyadic amplifier instrument will then indicate that situation of operation by reversely deflected pointer indications, similar to a reversal of sign. A zero pointer indication will prevail for all equal values of the output signals in balanced operation of the paired dyadic generators Y1 and Y2, that is, when the axes Y1 and Y2 make equal angles with the field vector. When the dyadic generator signals are unbalanced in operation as as result of different angular values between their rotation axis and the field vector, only their difference will then be effective to deflect the pointer of their output instrument, where the dial indicia may have polarity and easterly or westerly directional character and the scale may be graduated in terms of percentage of the maximum difference reading obtainable for all orientations of the dyadic pair, which would be 100 percent.

This dyadic difference indication is outlined most simply in the expression: $(\sin \phi - \sin \theta) \ 100 = D_0$, where $\phi$ is the angle of excitation of Y1 in unbalanced dyadic operation (that is, the field or excitation vector not lying at equal angles with the shafts of the two dyadic generators); $\theta$ is the angle of excitation of Y2 in unbalanced dyadic operation; and, $D_0$ is equal to the subtractive differential as translated in percent of the above stated maximum difference signal and as may then be read from the dial and pointer indication at the respective dyadic output instrument.

It is recommended that the dyadic indicating instrument should have each half of its dial calibrated as a scale having 100 graduations with major and minor divisions accurately co-ordinated for pointer indications in percentage terms. And, each half of the dial should be distinctly marked to identify the generators actually co-ordinated with the particular instrument; as in examples at FIG. 5.

Referring again to FIG. 2, the P6 control is provided especially for use as a zero and drift angle compensator for the dyadic output instrument, and it may be used for other variety of corrective measures. As for instance, to counteract and nullify the effects of immediately localized extraneous fields at that instrument. And/or, to check, detect and to correct the zero and other indications of the instrument when mounted and operated in a vehicle.

As a special feature of this invention a group of its generators will provide instantaneously related output signals which may be so combined as to make determinable the component of hte field or excitation vector in any geometrical direction.

Also in respect to precision, the several other controls and adjustments already referred to will enable any reasonably skilled technician to co-ordinate all operation and, if necessary, to compensate for manufacturing variables which might creep in at assembly or in circuitry and components used.

In FIG. 3, the symmetrical arrangement illustrates and outlines another example in disposition of similar signal generators wherein the dyadic scheme of detector sensitivity is developed further as in dual dyadic attitudes, having the central unit and a few features carried over from the drawing of FIG. 1. With this disposition the dyadic units Y3 and Y4 have been added for monitoring deviations of operation in the vertical plane of the line U–D, while perpendicular relative thereto, the plane of the horizontal line E–W has the previously paired dyadic units Y1 and Y2, and, with the central Y unit being disposed at equal angles between the dyadic units.

The diagrammatic drawing of FIG. 4 may immediately be associated with the panel view of instrumentation shown in FIG. 5. Therein for operation and attitude of the group of generators as shown at the right half of FIG. 4, all of the indicating instruments will have their pointers at zero, and, the index of a comparable horizontal compass indication would coincide with N (north) as illustrated in full lines in the ellipse near the bottom of FIG. 4.

On the other hand, for 180 degrees of reorientation as by turning the assembly about the Z-AXIS and with the attitude in operation as represented in phantom manner of illustration at the left half of FIG. 4, the Y indicating instrument at the panel will indicate a maximum value of output signal for the 90 degree angle of excitation in operating attitude of the central unit represented in phantom manner at Y', and, the index at the ellipse near the bottom of FIG. 4 will coincide with S (south) for the 180 degrees of reorientation. Whereat the dyadic units in operation at Y1' and Y2' will be balanced with equal 90 degree angles of excitation, and the dyadic units in operation at Y3' and Y4' will also be balanced with equal 60 degree angles of excitation, and, in having dyadically balanced situations of operation without any subtractive differential in value of their paired and related dyadic output signals, their respective dyadic indicating instruments will have their pointers at zero as shown at the panel view in FIG. 5.

Still referring to the FIGURES 4 and 5, it will be pointed out that as related and described above, in the first instance the central generator Y had a zero output signal and indication. Then, for the 180 degrees of re-orientation, its output signal was at a maximum for the attitude of operation at Y'. The indications in the above two successive attitudes established for the location a north magnetic latitude and with definite north and south magnetic directions being indicated, electrically and also by a horizontal compass, if provided. From which it will be seen still further that if the operations had occurred at a relatively similar planetary location of south magnetic latitude, as between the magnetic equator and the south magnetic pole, the output signals from the central generator would have been indicated reversely, as zero for the operating attitude at Y' and a maximum at Y, while retaining the correct indications for magnetic north and south directions at the simulated horizontal compass index and electrically, as in conjunction of zero-north, or zero-south, for either of the planetary locations of operation.

The orientation of the navigation device, and the vehicle to which its base is fixedly related, with respect to the axis of excitation or magnetic field can be determined by observation of the indicating means and by conversion of the readings when desired to angles in degrees. With the base 1 leveled the magnetic latitude can be determined from the field direction. The intensity or magnetic flux density of the field can also be measured and these data can be used in comparison with other known data concerning the planetary magnetic field to provide information about the location of the vehicle.

Normally, it is intended that the sensing structures will be mounted fixedly relative to the vehicle, while at the same time generally set and fixed relative operating attitudes will then not need to be disturbed in any of the ordinary conditions encountered during travel of a vehicle. It will also be obvious that the disclosed navigation means may be adopted in widely diversified applications without in any way changing or altering the essential character and principles of operation of the invention.

This invention may be developed within the scope of the following claims without departing from the essential features of the invention, and it is desired that the specification and drawing be read as being merely illustrative of the practical embodiment of the said invention and not in strictly limiting sense.

What I claim is:

1. In a structure of the character described and comprising, in combination, a mounting base having a centrally vertical pivot member attached thereto and a calibrated dial on said base concentric relative to said pivot, a vertically positioned and centrally swivelled U-yoke member about said pivot and having an index in register with said dial, an adjustable locking means engaging said U-yoke to said pivot, a horizontally positioned cross-yoke member having its end shafts extending through journals at the side members of said U-yoke, another adjustable locking means engaging one end shaft of said cross-yoke to one side member of said U-yoke, another calibrated dial at the other end shaft of said cross-yoke and said dial being in register with an index at the same side member of said U-yoke, a drive unit and brackets attached at opposite sides of said cross-yoke and having the drive shaft of said drive unit extending centrally through said cross-yoke, a group of three similar A.-C. sine wave signal generators having their rotation shafts at diverging coplanar angles and mounted with bearings and means of support attached to said brackets and wherein the rotation axis of the central coplanar generator shaft bisects the angle between the rotation axes of the remaining coplanar generator shafts at equal complementary angles, a bevel gear on each generator shaft, the gears on adjacent shafts being in mesh and the central generator shaft being directly coupled to the shaft of said drive, a current collector ring insulated on each generator shaft and each ring connected with a lead to one end of its respective generator winding, a brush operating means at each collector ring and each ring and brush having electrical means of connection to a respective terminal at a terminal block, a lead and means electrically connecting the remaining end of each generator winding to its respective shaft, a brush operating directly at the surface of each generator shaft and having electrical means of connections to a common electrical terminal at said block, and, two separate terminals at said block for leads of said drive.

2. In a structure as defined in claim 1, including two additional and similar signal generator units in said group together with mounting, drive connection and electrical connection means for cooperation therewith, and having said additional generator units with their rotation axes in assembly of said group at diverging angles in a plane perpendicular to the axis of said cross-yoke member and as coplanar with and bisected by the rotation axis of said coplanar central generator shaft at equal complementary angles.

3. In a structure as defined in claim 2, the adaptation of said means in an assembly wherein the rotation axis of said coplanar central generator shaft bisects the angle between the rotation axes of the remaining generators in said group at equal angles of 30 degrees.

4. In a structure as defined in claim 2, the adaptation of said means in an assembly wherein the rotation axis of the said central generator shaft bisects the angle between the rotation axes of at least one pair of said generators coplanar therewith at equal angles of not less than 15 degrees but not more than 45 degrees.

References Cited by the Examiner

UNITED STATES PATENTS

| | | | |
|---|---|---|---|
| 1,047,157 | 12/1912 | Bliss | 33—204 |
| 1,840,911 | 1/1932 | Minorsky | 33—204 |
| 1,963,551 | 6/1934 | Gunn | 33—204 |
| 1,977,615 | 10/1934 | Beers | 33—204 |
| 2,416,678 | 3/1947 | Borsum | 33—204 |

FOREIGN PATENTS 672,681    9/1929    France.

OTHER REFERENCES

P. V. H. Weems: Marine Navigation, D. Van Nostrand, N.Y., 1940 (VK555. W36), pages 39–40.

Aviation Week, vol. 68, No. 24, page 76 (June 16, 1958).

ROBERT B. HULL, *Primary Examiner.*